United States Patent Office 3,005,363
Patented Oct. 24, 1961

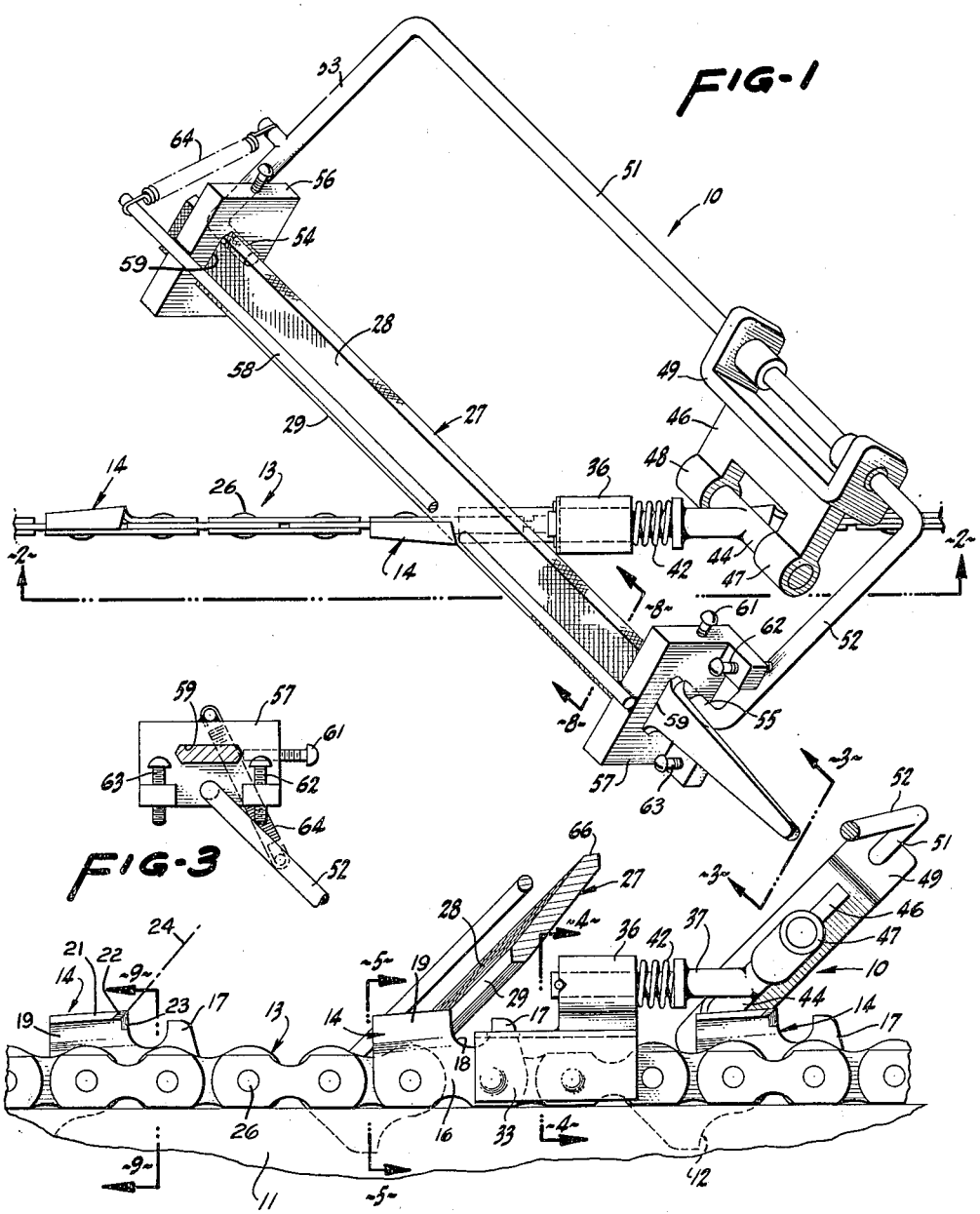

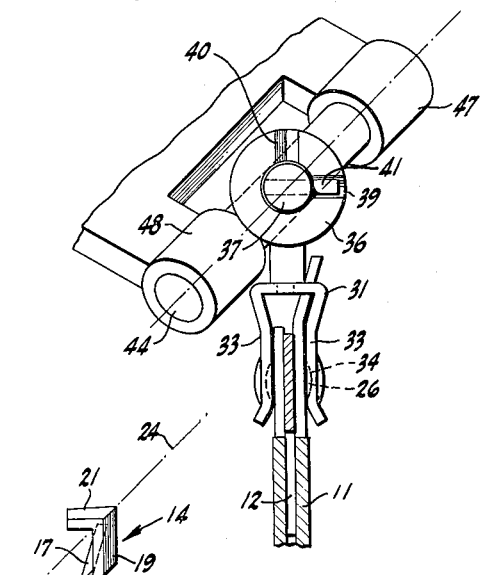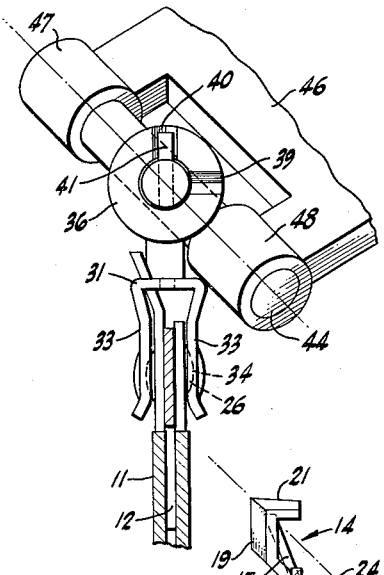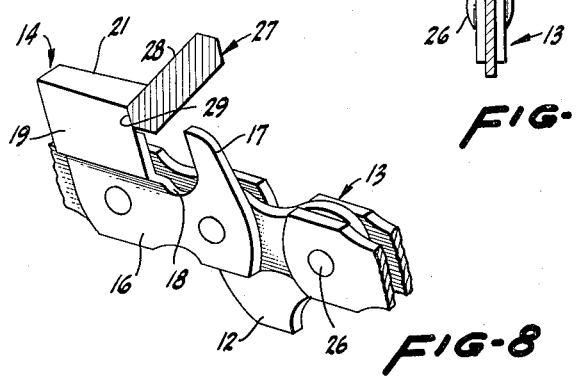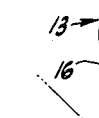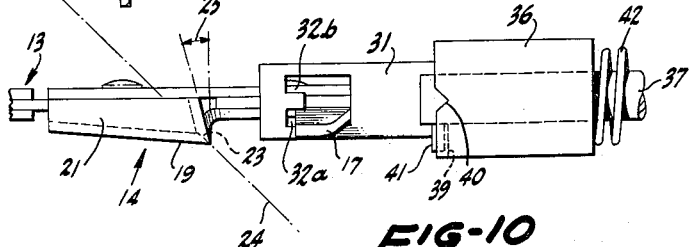

3,005,363
PORTABLE CHAIN SAW FILING DEVICE
Charles Newman, 429 N. Harrison, Fort Bragg, Calif.
Filed Apr. 28, 1958, Ser. No. 731,278
10 Claims. (Cl. 76—36)

This invention broadly relates to apparatus for sharpening saws and specifically to devices for filing the teeth of chain saws.

Semi-portable and portable chain saws are now in universal use and are particularly in use on farms and in the forests of America as well as elsewhere.

It is axiomatic that the effectiveness of a tool for the work for which it is intended is directly proportional to its condition at the time of use. This is unquestionably the case of tools, such as saws in general and chain saws in particular, the effectiveness of which is controlled by their sharpness. When chain saws become dull they not only lose their efficiency, but become difficult to handle. It is thus imperative that they be maintained sharpened at all times. Since the greatest number of chain saws is used in the woods and farms usually distant from areas where sharpening machines are available, much time is lost when the chain saws are taken to machine shops for precision sharpening. This, of course, increases the operating costs and, as a result, chain saw users are reluctant to take the saws to maintenance shops for sharpening. It has, therefore, become the general practice to sharpen these saws by hand in the field. However, not only is this considered an undesirable and slow chore, but such haphazard sharpening oftentimes decreases the efficiency of the chain saw and may even reduce its useful life, since it is practically impossible to file all of the teeth at the same angle, the same depth and to the same degree of sharpness.

It is the primary object, therefore, of my invention to provide a highly portable device for filing chain saws in the field or on the farm, which can be operated by one without special skill in handling files.

A further object is to provide a device which will insure that the file is held in a proper relation to the saw teeth being sharpened.

Another object is to provide a chain saw sharpening device which, when clipped onto the teeth of the saw, accurately positions the file with respect to the teeth, and which neither requires that vises be used nor that the saw be modified to receive the device.

Yet another object is to provide a chain saw sharpening device comprising a shaft, means for mounting said shaft in fixed relation to a chain saw tooth, a pintle fixed to one end of said shaft and angularly inclined thereto, an elongated file, and means mounting said file in parallel spaced relation to said pintle, said file mounting means allowing longitudinal reciprocatory movement of said file.

A still further object is to provide a device for the file sharpening of chain saws having right and left-hand teeth on the chain thereof, and in which each of said teeth is provided with a depth gauge and with shank and toe portions having chisel cutting surfaces thereon which meet at a line of intersection, said device comprising: a clip adapted to snugly embrace one of said teeth, said clip having a notch therein engageable with the depth gauge of said one tooth, a sleeve mounted on said clip in parallelism to said chain, a shaft journaled in said sleeve for rotation between two preselected positions, a pintle fixed to one end of said shaft, said pintle being parallel to said line of intersection of the right-hand teeth when the shaft is in one of said two positions and being parallel to said line of intersection of the left-hand teeth when the shaft is in the other of said two positions, an elongated file, and means mounting said file for longitudinal reciprocatory movement thereof along a line in parallel spaced relation to said pintle.

Other objects and advantages will become apparent in the course of the following detailed description.

In the drawings, forming a part of this application, and in which like parts are designated by like reference numerals throughout the same, FIG. 1 is a plan view of the sharpening device clipped onto a chain saw, with portions broken away.

FIG. 2 is an elevational view, partly in section, taken on line 2—2 of FIG. 1.

FIG. 3 is a fragmental view of the file holding means as seen from line 3—3 of FIG. 1.

FIG. 4 is a sectional view, taken on line 4—4 of FIG. 2, and illustrating the position of elements when a left-hand tooth is filed.

FIG. 5 is a fragmental sectional view taken on line 5—5 of FIG. 2, illustrating the angle of the file in relation to the left-hand tooth when the elements are in the position of FIG. 4.

FIGS. 6 and 7 are similar to FIGS. 4 and 5, and illustrate the position of elements when a right-hand tooth is filed.

FIG. 8 is a view partly in section, taken on line 8—8 of FIG. 1, with the clip removed.

FIG. 9 is a sectional view taken on line 9—9 of FIG. 2, illustrating the chisel surfaces of the cutting edges of a tooth.

FIG. 10 is an enlarged detail of FIG. 1.

Referring now to the drawings, the sharpening device, generally indicated at 10, is used on a conventional chain saw having a saw bar 11 provided with a groove around the periphery thereof to receive the guide wings 12 of the link chain 13. The chain saw teeth 14 are spaced at desired intervals along the chain, and, as is conventional, are alternately right and left-handed when viewed from the front of a tooth.

Each tooth 14 comprises a link body 16 having a depth gauge 17 formed on the upper forward end thereof. The working part of the tooth is rearward of notch 18 and comprises an upwardly extending shank portion 19 and a toe portion 21 extending at approximately right angles to the shank portion. The toe and shank portions have inclined chisel cutting surfaces 22 and 23, respectively, which surfaces meet one another at a line of intersection 24. As will be seen from FIG. 10, the cutting edge of the toe portion 21 is inclined rearwardly at an angle 25. The links of the chain are held together by rivets having slightly protruding heads 26.

To properly sharpen the conventional chain saw teeth as above described, it is important that the angle of the toe chisel surface 22, the angle of the shank chisel surface 23, and the angle 25 be the same for all teeth, both right and left-hand teeth.

I have found that these angles may be properly formed by use of a conventional six-sided file 27 so held that the longitudinal axis of the file is parallel to the line of intersection 24 of the toe and shank chisel surfaces 22 and 23. In this position, the upper file surface 28 will cut the proper angle for the toe chisel surface 22, and the side file surface 29 will cut the proper angle in the shank chisel surface 23. In addition, in this position, the upper file surface 28 will also cut the proper angle 25 in the cutting edge of the toe portion 21.

The sharpening device 10 has been devised so that it may be clipped easily onto any tooth of the chain saw and so that it will hold the file 26 in the proper relation to the tooth surfaces to be sharpened discussed above. In addition, the device 10 is easily adjusted so that both right and left-hand teeth may be sharpened.

An inverted U-shaped clip member 31 is provided, to clip onto any desired tooth. As will be seen from FIG.

10, the clip member has a notch 32a formed through the top portion thereof to receive the depth gauge 17 of a left-hand tooth, in order to accurately position the clip member on the tooth. A similar notch 32b is provided to receive a right-hand tooth depth gauge, when the clip is mounted on a right-hand tooth. The side walls 33 of the clip member are provided with internal depressions 34 which slip over the rivet heads 26 of the chain saw teeth to help prevent accidental removal of the clip from the teeth.

A sleeve 36 is mounted on the forward end of the clip member 31, and a shaft 37 is mounted inside the sleeve for rotative and longitudinal movement therein. The sleeve 36 and shaft 37 are both parallel to the chain saw teeth when mounted thereon by the clip member 31.

The rearward end of sleeve 36 has two radially extending grooves 39 and 40, to receive the pin 41 mounted on the rearward end of shaft 37. As seen in FIGS. 1, 2, 4 and 6, when the device 10 is being used to sharpen left-hand teeth, the shaft 37 is rotated in sleeve 36 so that the pin 41 rests within groove 39, being held therein by the spring 42 which biases the shaft 37 forwardly. As shown in FIGS. 6 and 7, when it is desired to sharpen right-hand teeth, the shaft 37 is rotated until the pin 41 rests in groove 40.

A pintle 44 is formed on the forward end of shaft 37, and is angularly inclined relative thereto so that when the shaft is in the position shown in FIG. 4, the pintle 44 is parallel to the line of intersection 24 of the cutting surfaces of a left-hand tooth. Similarly, when the shaft 37 is rotated to the position shown in FIG. 6, the pintle 44 is parallel to the line of intersection of the cutting surfaces of a right-hand tooth.

A link 46 has formed at one end thereof sleeves 47 and 48 which surround the ends of pintle 44 to form a pivotal connection therebetween. A slide bearing 49 is formed on the other end of link 46, to receive the rod 51 therein. The slide bearing 49 allows the rod 51 to rotate and move longitudinally therein while holding the rod parallel to pintle 44 at all times.

The rod 51 has its end portions 52 and 53 bent at right angles to the main part of the rod, and also has its end extremities 54 and 55 again bent at right angles so that the end extremities 54 and 55 are parallel to the main part of the rod 51. A file holding block 56 is rotatively mounted on the rod end extremity 54, and a similar file holding block 57 is rotatively mounted on the other rod end extremity 55. A stiffening member 58 may bridge between the file holding blocks 56 and 57, if desired. Each file holding block is apertured, as at 59, to receive file 27, which is held rigidly therein by setscrews 61.

Adjustment screws 62 and 63 are threaded through the file holding blocks 57 in order to properly position the file surfaces with respect to the saw tooth cutting surfaces to be filed. As seen in FIGS. 1 and 3, when the device is used to sharpen left-hand teeth, the file 27 and file holding blocks 56 and 57 are rotated about the rod end extremities until the rotation is stopped by the abutment of adjustment screw 62 with the rod end portion 53. The file is then held in this position by the over-center mounted spring 64, and the file surfaces 27 and 28 are properly positioned relative to the saw tooth. If a right-hand tooth is to be sharpened, the file 26 is rotated about its axis until the adjustment screw 63 abuts the rod portion 53, at which time the spring 64 will again hold the elements in this new position. The file surfaces 28 and 66 will now be properly positioned to file the cutting edges of the toe and shank portions, respectively, of a right-hand saw tooth.

In the use of the device, it is first determined whether a left or right-hand saw tooth is to be filed. If it is decided to file a left-hand tooth the operator first rotates the shaft 37 within sleeve 36 until the locating pin 41 is pulled into groove 39 by spring 42. This is the position illustrated in FIG. 4. Also, the operator rotates the file and file holder to the position shown in FIGS. 1 and 3. The device is now ready for use, and is clipped onto a left-hand saw tooth, with the depth gauge 17 extending through the notch 32a of the clip member 31. The file 27 is now accurately positioned relative to the cutting surfaces of the tooth, and the file is reciprocated in a normal filing operation to sharpen the cutting surfaces of the tooth.

When it is desired to sharpen a right-hand tooth, the shaft 37 is pushed against the bias of spring 42, and rotated within sleeve 36 until the locating pin lies within groove 40, as illustrated in FIG. 6. The file is also rotated until the adjustment screw 63 abuts the rod portion 53. The device is again clipped onto the desired right-hand tooth, with the depth gauge 17 thereof extending through the notch 32b of the clip member. The file 27 is now accurately positioned relative to the cutting surfaces of a right-hand tooth, and normal filing is performed.

From the foregoing, it may be seen that a relatively simple device has been produced to enable chain saw teeth to be accurately filed. The device is easily portable, and is self contained so that no benches or vises are needed to support the file or the chain saw. Furthermore, there is no necessity that any holes be drilled into a chain saw to support the device; instead, the device may be mounted on any chain saw having teeth of the general character described.

It is to be understood that the form of the invention, herewith shown and described, is to be taken as a preferred embodiment of the same, and that various changes in the shape, size and arrangement of parts may be resorted to, without departing from the spirit of the invention, or the scope of the attached claims.

Having thus described my invention, what I claim and desire to secure by Letters Patent is:

1. A device for the file sharpening of a chain saw tooth in which said tooth is provided with a depth gauge and with shank and toe portions having chisel cutting surfaces thereon which meet at a line of intersection, said device comprising: a clip adapted to snugly embrace said tooth, said clip having a notch therein engageable with the depth gauge of said tooth, a pintle mounted in fixed relation to said clip, said pintle having its axis parallel to said line of intersection of the cutting surfaces of said tooth, a link pivotally mounted at one end thereof on said pintle and having a slide bearing at the other end thereof, a rod journaled in said slide bearing for rotation and longitudinal movement parallel to said pintle, a file holding means carried by said rod for movement therewith, and an elongated file mounted in said file holding means in parallel spaced relation to said rod.

2. A device for the file sharpening of chain saws having right and left-hand teeth on the chain thereof, and in which each of said teeth is provided with a depth gauge and with shank and toe portions having chisel cutting surfaces thereon which meet at a line of intersection, said device comprising: a clip adapted to snugly embrace one of said teeh, said clip having a notch therein engageable with the depth gauge of said one tooth, a sleeve mounted on said clip in parallelism to said chain, a shaft journaled in said sleeve for rotation between two preselected positions, a pintle fixed to one end of said shaft, said pintle being parallel to said line of intersection of the right-hand teeth when the shaft is in one of said two positions and being parallel to said line of intersection of the left-hand teeth when the shaft is in the other of said two positions, an elongated file, and means mounting said file for longitudinal reciprocatory movement thereof along a line in parallel spaced relation to said pintle.

3. A device for the file sharpening of chain saws having right and left-hand teeth on the chain thereof, and in which each of said teeth is provided with a depth gauge and with shank and toe portions having chisel cutting surfaces thereon which meet at a line of intersection, said device comprising: a clip adapted to snugly embrace one of said teeth, said clip having a notch therein engageable with the depth gauge of said one tooth, a sleeve mounted on said clip in parallelism to said chain, a shaft journaled in said sleeve for rotation between two preselected positions, a pintle fixed to one end of said shaft, said pintle being parallel to said line of intersection of the right-hand teeth when the shaft is in one of said two positions and being parallel to said line of intersection of the left-hand teeth when the shaft is in the other of said two positions, a link pivotally mounted at one end thereof on said pintle and having a slide bearing at the other end thereof, a rod journaled in said slide bearing for rotation and longitudinal movement parallel to said pintle, a file holding means carried by said rod for movement therewith, and an elongated file mounted in said file holding means in parallel spaced relation to said rod.

4. A device for the file sharpening of chain saws having right and left-hand teeth on the chain thereof, and in which each of said teeth is provided with a depth gauge and with shank and toe portions having chisel cutting surfaces thereon which meet at a line of intersection, said device comprising: a clip adapted to snugly embrace one of said teeth, said clip having a notch therein engageable with the depth gauge of said one tooth, a sleeve mounted on said clip in parallelism to said chain, a shaft journaled in said sleeve for rotation between two preselected positions, a pintle fixed to one end of said shaft, said pintle being parallel to said line of intersection of the right-hand teeth when the shaft is in one of said two positions and being parallel to said line of intersection of the left-hand teeth when the shaft is in the other of said two positions, a link pivotally mounted at one end thereof on said pintle and having a slide bearing at the other end thereof, a rod journaled in said slide bearing for rotation and longitudinal movement parallel to said pintle, a file holding means carried by said rod for movement therewith, an elongated file mounted in said file holding means in parallel spaced relation to said rod, and means to allow limited axial rotation of said file in said file holding means between preselected positions.

5. A chain saw sharpening device comprising a pintle having a pintle axis, means for rotatably mounting said pintle upon a pivot axis that is fixed relative to a mounted chain saw tooth, said pivot axis being disposed in the plane of the guide wing plane of said chain saw tooth and substantially parallel with the longitudinal axis of said tooth, said pintle axis and said pivot axis intersecting and being angularly inclined at a predetermined sharpening angle, a link pivotally mounted at one end thereof on said pintle axis, said link having a slide bearing at the other end thereof, a rod journaled in said slide bearing for rotation and longitudinal movement parallel to said pintle axis, a file holding means carried by said rod for movement therewith, and an elongated file mounted in said file holding means in parallel spaced relation to said rod; whereby said pintle member and said link may be pivoted into alternate positions for sharpening both right and left-hand chain saw teeth members.

6. A chain saw sharpening device comprising a pintle member having a pintle axis and including a pintle mounting shaft having a mounting axis, said pintle axis and said mounting axis intersecting and being angularly inclined at a predetermined sharpening angle, means for rotatably mounting said pintle member upon said mounting axis in angularly fixed relation to a chain saw tooth, said pintle shaft being disposed with said mounting axis in the guide wing plane of said chain saw tooth and substantially parallel with the longitudinal axis of said tooth, a link pivotally mounted at one end thereof on said pintle axis, said link having a slide bearing at the other end thereof, a rod journaled in said slide bearing for rotation and longitudinal movement parallel to said pintle axis, a file holding means carried by said rod for movement therewith, and an elongated file mounted in said file holding means in parallel spaced relation to said rod; whereby said pintle member and said link may be pivoted into alternate positions for sharpening both right and left-hand chain saw teeth members.

7. A chain saw sharpening device comprising a pintle member having a pintle axis and including a pintle mounting shaft having a mounting axis, said pintle axis and said mounting axis intersecting and being angularly inclined at a predetermined sharpening angle, means for rotatably mounting said pintle member upon said mounting axis in angularly fixed relation to a chain saw tooth, said means including a clip for clamping engagement with said chain saw tooth said clip having a notch therein engageable with the depth gauge of said tooth, said pintle shaft being supported with said mounting axis in the guide wing plane of said chain saw tooth and substantially parallel with the longitudinal axis of said tooth, a link pivotally mounted at one end thereof on said pintle axis, said link having a slide bearing at the other end thereof, a rod journaled in said slide bearing for rotation and longitudinal movement parallel to said pintle axis, a file holding means carried by said rod for movement therewith, and an elongated file mounted in said file holding means in parallel spaced relation to said rod; whereby said pintle member and said link may be pivoted into alternate positions for sharpening both right and left-hand chain saw teeth members.

8. A chain saw sharpening device comprising a sleeve member defining a pintle mounting axis, a clip fixed to said sleeve for clamping engagement with a chain saw tooth, said clip having a notch therein engageable with the depth gauge of said tooth, said sleeve then being mounted in angularly fixed relation to said chain saw tooth with said mounting axis disposed in the guide wing plane of said chain saw tooth and substantially parallel with the longitudinal axis of said tooth, a pintle member having a pintle axis and including a pintle mounting shaft received in said sleeve for limited rotation therein between preselected positions, said pintle axis and said mounting axis intersecting and being angularly inclined at a predetermined sharpening angle, a link pivotally mounted at one end thereof on said pintle axis, said link having a slide bearing at the other end thereof, a rod journaled in said slide bearing for rotation and longitudinal movement parallel to said pintle axis, a file holding means carried by said rod for movement therewith, and an elongated file mounted in said file holding means in parallel spaced relation to said rod; whereby said pintle member and said link may be pivoted into alternate positions for sharpening both right and left-hand chain saw teeth members.

9. A chain saw sharpening device comprising a sleeve member defining a pintle mounting axis, a clip fixed to said sleeve for clamping engagement with a chain saw tooth, said clip having a notch therein engageable with the depth gauge of said tooth, said sleeve then being mounted in angularly fixed relation to said chain saw tooth with said mounting axis disposed in the guide wing plane of said chain saw tooth and substantially parallel with the longitudinal axis of said tooth, a pintle member having a pintle axis and including a pintle mounting shaft received in said sleeve for limited rotation therein between preselected positions, said pintle axis and said mounting axis intersecting and being angularly inclined at a predetermined sharpening angle, a link pivotally mounted at one end thereof on said pintle axis, said link having a slide bearing at the other end thereof, a rod journaled in said slide bearing for rotation and longitudinal movement parallel to said pintle axis, a file holding means pivotally carried by said rod for movement therewith, means to allow limited axial rotation of said file holder between preselected positions, and an elongated file mounted in said file holding means in parallel spaced relation to said rod; whereby said pintle member, said link and said file holding means may be pivoted into alternate positions for sharpening both right and left-hand chain saw teeth members.

10. A device for the file sharpening of a chain saw tooth in which said tooth is provided with a depth gauge and with shank and toe portions having chisel cutting surfaces thereon which meet at a line of intersection, said device comprising: a clip adapted to snugly embrace said tooth, said clip having a notch therein engageable with the depth gauge of said tooth, a pintle mounted in fixed relation to said clip, said pintle having a pintle axis parallel to said line of intersection of the cutting surfaces of said tooth, and guide means rotatably mounted upon said pintle axis for supporting and guiding an elongated file in a direction parallel with said pintle axis.

References Cited in the file of this patent

UNITED STATES PATENTS

| | | |
|---|---|---|
| 506,698 | Johnson | Oct. 17, 1893 |
| 2,736,216 | Paradis et al. | Feb. 28, 1956 |
| 2,762,241 | Nielson | Sept. 11, 1956 |
| 2,817,252 | Simmons | Dec. 24, 1957 |
| 2,818,752 | Granberg | Jan. 7, 1958 |
| 2,833,165 | Irwin | May 6, 1958 |
| 2,896,481 | Hebbert | July 28, 1959 |